United States Patent Office 3,654,297
Patented Apr. 4, 1972

3,654,297
PROCESS FOR OXIDIZING 2-MERCAPTO-BENZOTHIAZOLE
George Constantine Goulandris, Brooklyn, N.Y., assignor to American Cyanamid Company, Stamford, Conn.
No Drawing. Filed Feb. 10, 1969, Ser. No. 798,138
Int. Cl. C07d 91/48
U.S. Cl. 260—306.5                                                    6 Claims

ABSTRACT OF THE DISCLOSURE

A process for oxidizing 2-mercaptobenzothiazole by heating an organic solution thereof, containing less than 15% water in the presence of a free-oxygen containing gas and a catalytic amount of a cobalt phthalocyanine sulfonate at a temperature between 25° C. and 200° C. The product 2,2'-dithiobisbenzothiazole is produced in significant amounts by conducting the reaction at a temperature of from about 50° C. to 80° C., while the product 2,2'-thiobisbenzothiazole is produced in significant amounts when the reaction temperature is from about 130° C. to 180° C.

---

This invention relates to an improved process for oxidizing 2-mercaptobenzothiazole (hereinafter designated as MBT). More particularly, this invention relates to the production of 2,2'-thiobisbenzothiazole, 2,2'-dithiobisbenzothiazole (hereinafter designated as MBTS), and benzothiazylsulfenamides by oxidizing MBT.

MBTS is presently used as a rubber vulcanization accelerator. In addition, it is an important intermediate for the production of various sulfenamides which themselves are very useful as rubber chemicals and especially as vulcanization accelerators.

At the present time, MBTS is produced commercially by oxidizing an alkali metal salt of MBT in aqueous solution with chlorine. Since MBT is insoluble in water, it cannot be directly oxidized with chlorine. Therefore, it is first converted to the alkali metal salt, usually sodium MBT, prior to its conversion to MBTS with chlorine. Since MBT is prepared from aniline, carbon disulfide and sulfur and is obtained in the form of a melt that contains some tars, it must be purified. This is now effected by the conversion to the alkali metal salt by a series of extractions with an alkali metal hydroxide. The product obtained is an aqueous solution of alkali metal MBT which can be separated from the insoluble tars and may be easily converted to MBTS by oxidation. However, these multiple extractions are time consuming and costly and therefore, are undesirable. It would be highly desirable to eliminate the extraction steps by providing a process for directly oxidizing MBT to high purity MBTS in high yields.

The chlorine-oxidation of the alkali metal MBT is conducted in the presence of a buffer, usually sodium carbonate, at an elevated temperature until the pH of the reaction mixture drops to a specified level. Careful control must be exercised during reaction since chlorine gas is highly toxic. In addition, care must be taken during the reaction to control the concentration of buffer so that the desired pH control is obtained. Furthermore, because chlorine is a strong oxidizing agent, over-oxidation to sulfonic and sulfenic acids always occurs with the present process with a corresponding yield decrease. These factors necessitate close monitoring of the reaction with the attendant undesirable apparatus expense associated therewith. It would be highly desirable to provide an oxidation process which employs a non-toxic oxidant and which does not require close controls of reaction conditions.

The MBTS produced by chlorine-oxidation is obtained by filtering and washing. The MBTS is usually above 90% pure but many times contains MBT in amounts up to about 2% and always contains some undesirable sulfonic acid and sulfenic acid byproducts. Furthermore, the average particle size of the MBTS obtained by chlorine oxidation is relatively small, in the order of about 1–2 microns. This is undesirable when it is desired to employ MBTS as a rubber additive since the small particle size product is difficult to disperse therein. For these reasons, the MBTS produced by the chlorine-oxidation process must be recrystallized to purify the product and particularly to increase the average particle size and thereby facilitate dispersion thereof in rubber compositions. It would be desirable to eliminate the recrystallization steps since they are time consuming and expensive and invariably result in solvent and product losses.

As stated previously, MBTS is useful as a starting material for the production of benzothiazyl sulfenamides. Benzothiazyl sulfenamides are presently produced by reacting MBT or MBTS with an N-chloroamine in the presence of a hydrogen chloride acceptor. Upon completion of the reaction, the hydrochloride form of the acceptor must be separated from the benzothiazyl sulfenamide product. It is the present commercial practice to separate the hydrochloride form of the acceptor from the reaction mixture by reacting the hydrochloride with ammonia to form the acceptor and ammonium chloride crystals. The ammonium chloride is recovered by filtration while the acceptor remains in solution with the product. The benzothiazyl sulfenamide, which is usually obtained in molten form, is obtained by evaporating the solvent and the acceptor. Thereafter the benzothiazyl sulfenamide is flaked. Thus, in the present commercial practices for obtaining benzothiazyl sulfenamides, a plurality of reaction and separation steps are required which are time consuming and costly.

It is an object of the present invention to provide a process for obtaining MBTS having a relatively large particle size. It is a further object of the present invention to provide a process for obtaining MBTS from MBT without employing extraction steps for the MBT. It is a further object of the present invention to provide a process for obtaining MBTS without sulfenic acid or sulfonic acid by-products. It is a further object of the present invention to provide a process for obtaining MBTS without the use of chlorine or other strong oxidants. A still further object of the present invention is to provide a process employing one reaction step for obtaining benzothiazyl sulfenamides by oxidizing MBT in the presence of a primary or secondary amine. Further objects of the present invention will become evident in view of the following detailed discussion.

The present invention provides a process for oxidizing MBT in an essentially non-aqueous medium to form MBTS in the presence of a catalytic amount of a cobalt phthalocyanine sulfonate catalyst. It has been found that only a catalytic amount of cobalt phthalocyanine sulfonate is necessary to effect oxidation to MBTS in the essentially non-aqueous medium. This is indeed surprising since cobalt phthalocyanine sulfonate catalysts must be employed in stoichiometrc amounts in order to effect oxidation of MBT to MBTS in an aqueous medium. That is, in an aqueous medium, cobalt phthalocyanine sulfonate catalysts must be employed in an amount above about 100 mole percent, based upon the MBT in order to obtain MBTS. In the present invention, cobalt phthalocyanine sulfonate catalysts can be employed in an amount as low as 0.1 mole percent and preferably from about 0.2 to about 5 mole percent based upon MBT to obtain a significant yield of MBTS. It is not necessary to employ a larger amount of catalyst since the yield of MBTS is not significantly increased nor is the speed of reaction significantly increased. Furthermore, larger amounts of catalyst are not desirable due to the increased cost.

To effect reaction, an MBT melt is first dissolved in either a polar or non-polar organic solvent. Polar solvents which can be employed include alkanols such as methanol and ethanol; glycols such as ethylene glycol, propylene glycol and the like; dimethylformamide, dimethylacetamide and dimethylsulfoxide. Non-polar organic solvents which have been found to be useful include chlorobenzene, toluene, nitrobenzene, chloronaphthalene and the like. It is preferred to employ polar solvents since the conversion to MBTS is significantly improved therewith. As stated above, an essentially non-aqueous medium is employed in the present invention. By the phrase "essentially non-aqueous" as employed herein is meant a reaction medium wherein water can be present in small amounts without necessitating the use of increased amounts of catalyst, significantly reducing MBTS yields or significantly reducing the solubility of MBT in the solvent. Thus, in the present invention water can be present in the reaction mixture in amounts up to about 15% based upon solution weight.

The MBT solution is mixed with a catalytic amount of a cobalt phthalocyanine sulfonate such as cobalt phthalocyanine disulfonate, cobalt phthalocyanine trisulfonate, cobalt phthalocyanine tetrasulfonate, mixtures thereof and the like. A free-oxygen containing gas such as air or oxygen is then bubbled through the reaction mixture which is maintained at a temperature between about 15° C. and 130° C., preferably between about 50° C. and about 80° C. When operating at a temperature below about 50° C. the rate of MBTS formation is significantly reduced while when operating above about 130° C., the monosulfide, 2,2'-thiobisbenzothiazole, is produced in significant amounts while reducing MBTS yields. Thus, when it is desired to produce the monosulfide by the process of this invention, the oxidation is carried out at a temperature above about 130° C. up to about 180° C. The MBTS can be separated by filtration from any unreacted MBT or from the monosulfide. The monosulfide may be recovered by solvent evaporation.

The cobalt phthalocyanine sulfonate catalyst useful in the present invention can be obtained by methods well known in the art. These catalysts are commonly prepared by reacting cobalt phthalocyanine with 25–30% fuming sulfuric acid.

The present invention also provides a process for making benzothiazyl sulfenamides from MBTS which is produced in accordance with this invention. This is effected by carrying out the oxidation reaction described above in the presence of either a primary or a secondary amine. This reaction is carried out under the conditions set forth above with the only modification being the addition of the amine. In order to substantially completely convert the MBTS to the sulfenamide at least one mole, preferably between 2 moles and 5 moles of amine per mole of MBT are employed. Suitable amines which can be employed are defined by Formula I:

(I)

wherein R can be either hydrogen or lower alkyl, R' can be lower alkyl of 1 to 7 carbon atoms or cycloalkyl, or together R and R' can form the remainder of an N-heterocycle moiety such as piperidino, morpholino and the like. Suitable amines include morpholine, 2,6-dimethylmorpholine, piperidine; cycloalkyl compounds such as cyclohexyl amine and cyclopentyl amine; and alkyl amines such as tertiary butyl amine, isopropyl amine, ethanolamine and the like.

After the reaction is completed, the solvent is evaporated, usually under vacuum, at a temperature between about 50° C. and about 200° C., depending on the solvent used, to leave the product as a residue.

The process of this invention can be carried out with minor modifications without departing from the scope thereof. Thus, if it is desired to prepare the catalyst as a finely divided aqueous suspension to effect homogeneous dispersion thereof in the reaction medium, the presence of water in the system in amounts below about 15 weight percent will not adversely affect reaction. Similarly, small amounts of an aliphatic carboxylic acid usually from 1 to 10 volume percent may be added to the solution to improve solubility of the catalyst. Suitable acids which can be added include acetic, propionic, citric, malonic, succinic and the like. Generally, it is preferred to use a small amount of acid, preferably acetic acid, to accomplish this function in amounts up to about 5% of the volume of solvent.

Furthermore, a surface active agent can be added to the reaction mixture to assure homogeneous dispersion of the reactants and catalysts and thus assist in driving the reaction to completion. Non-ionic surface active agents are preferred since the reaction is of the free radical type. Suitable surface active agents include alkyl aryl polyethylene glycol ethers, dialkanol amides of fatty acids, ethylene oxide-alkyl phenol condensation products and the like. Suitable catalyst dispersing agents which can be employed include ammonia or ammonium acetate.

The following examples illustrate the present invention and are not intended to limit the same.

EXAMPLE 1

To a solution of 25 grams of 2-mercaptobenzothiazole, dissolved in 700 ml. of N,N-dimethylforamide, was added 1 gram of cobalt phthalocyanine disulfonate, 5 ml. of glacial acetic acid, and 2 drops of a non-ionic alkyl aryl polyethylene glycol ether surface active agent. The solution was heated and maintained at 70° C. as oxygen was passed through the solution for 2.5 hours. The MBTS precipitate formed was filtered off and washed. There was obtained a 97.9% conversion of MBT to MBTS having a purity of 99.30% and an MBT content of less than 0.1%. This example represents a preferred embodiment of the invention.

EXAMPLE 2

To a solution of 25 grams of 2-mercaptobenzothiazole, dissolved in 750 ml. of ethanol, was added 7 ml. of concentrated ammonia, 2.5 ml. of glacial acetic acid and 0.9 gram of cobalt phthalocyanine disulfonate dissolved in 1.5 ml. of water. Oxygen was bubbled through this solution for 2.5 hours at 60° C. The MBTS precipitate formed was filtered off and dried. There was obtained 24.22 grams of MBTS having a purity of 99.17% and a free MBT content of less than 0.1%. The filtrate did not show any evidence of sulfonic or sulfenic acids. The particle size range was 5–100 microns with a mean particle size of 20–80 microns.

Similar results were obtained when using N,N-dimethylformamide as solvent.

EXAMPLE 3

In accordance with the procedure of Example 1, an aqueous solution containing 5 grams of sodium MBT per 100 ml. of water was used in the absence of a catalyst. Air was passed through the solution for 2 hours at 70° C. No MBTS was obtained. This example illustrates that MBT will not be oxidized to MBTS in the absence of a catalyst.

EXAMPLE 4

The procedure of Example 3 was followed except that 1 gram (0.0014 mole) of cobalt phthalocyanine disulfonate was added to the aqueous solution. A conversion to MBTS of only 2% was obtained. This example illustrates that less than a stoichiometric amount of cobalt phthalocyanine disulfonate catalyst in an aqueous medium will not effect reaction to MBTS.

EXAMPLE 5

To a solution of 25 grams of 2-mercaptobenzothiazole, dissolved in 500 ml. of monochlorobenzene, was added 1 ml. conc. $NH_3$, 2.4 ml. glacial acetic acid, 10 ml. water and 0.1 gram of cobalt phthalocyanine disulfonate. The solution was oxidized with oxygen for 3 hours at 90° C. The monochlorobenzene was steam stripped to give an MBTS residue. The conversion to MBTS was 47.5%.

This example illustrates the use of a non-polar solvent and indicates that the reaction is slower than with a polar solvent.

EXAMPLE 6

To a solution of 25 grams of 2-mercaptobenzothiazole, dissolved in 750 ml. of ethanol, was added 0.1 gram of copper phthalocyanine. Oxygen was passed through this solution for 4 hours at 65° C. without any evidence of the formation of MBTS. The same results were obtained when copper phthalocyanine sulfonate was substituted for the copper phthalocyanine. This example illustrates the necessity of using the cobalt phthalocyanine sulfonate catalyst to produce MBTS.

EXAMPLE 7

To a solution of 25 grams of 2-mercaptobenzothiazole, dissolved in 750 ml. of ethanol, was added 0.5 gram ammonium acetate and 0.05 gram cobalt phthalocyanine. The solution was treated with oxygen for 4 hours at 65° C. without evidence of the formation of MBTS.

This example shows that the non-sulfonated cobalt phthalocyanine catalyst is not operative in the present invention.

EXAMPLE 8

To a solution of 25 grams of 2-mercaptobenzothiazole, dissolved in 850 ml. of ethanol, was added 1.0 gram of ammonium acetate and 0.2 gram of cobalt phthalocyanine disulfonate in 10 ml. of water. Oxygen was passed through the solution at 60° C. for a period of 3 hours as 100 ml. of morpholine was added incrementally. There was obtained a conversion of MBT to 2-(morpholinothio)benzothiazole of 33.1%.

This example illustrates the use of this process to make sulfenamides.

EXAMPLE 9

The procedure of Example 1 was repeated except that the temperature was maintained at 135° C. No MBTS crystals were formed during the reaction. The solution was left to cool to room temperature whereupon a small amount (2 g.) of MBTS precipitated and was filtered.

The mother liquor was analyzed for thiazole derivatives. Based on the MBT charged there was obtained less than 0.5 gram each of benzothiazole, MBT and MBTS while 19.0 grams of the monosulfide was obtained. This represents an 84% yield of monosulfide based on the MBT charged.

This example shows that by raising the reaction temperature to 135° C., the monosulfide is obtained in high yields.

I claim:

1. A process for directly oxidizing 2-mercaptobenzothiazole which comprises reacting the 2-mercaptobenzothiazole, dissolved in an organic solvent medium containing not more than 15 percent by weight of water, with a free oxygen containing gas at a temperature of from about 25° C. to about 200° C., in the presence of a catalyst selected from the group consisting of cobalt phthalocyanine sulfonate, cobalt phthalocyanine disulfonate, cobalt phthalocyanine trisulfonate, cobalt phthalocyanine tetrasulfonate and mixtures thereof in an amount of from about 0.1 to 5 mole percent based on the mercaptobenzothiazole.

2. The process of claim 1 wherein the solvent is a polar solvent.

3. The process of claim 1 wherein the catalyst is cobalt phthalocyanine disulfonate.

4. The process of claim 1 wherein from 1 to 10 volume percent of an acid selected from the group consisting of acetic and propionic acid, citric acid, malonic acid and succinic acid is added to the reaction mixture.

5. The process of claim 1 wherein the reaction is carried out at a temperature between about 25° C. and about 130° C. and 2,2'-dithiobisbenzothiazole is recovered as a product.

6. The process of claim 1 wherein the reaction is carried out at a temperature between about 130° C. and about 180° C. and 2,2'-thiobisbenzothiazole is recovered as a product.

References Cited
UNITED STATES PATENTS 3,463,783   8/1969   Strauss et al. _____ 260—306.5

ALEX MAZEL, Primary Examiner

R. V. RUSH, Assistant Examiner

U.S. Cl. X.R.

260—306.6 R, 306.6 A